United States Patent [19]

Schützer et al.

[11] 3,990,471
[45] Nov. 9, 1976

[54] FLAP VALVE

[75] Inventors: Gerhard Schützer, Stuhr; Friedrich Schittek, Bremen, both of Germany

[73] Assignee: Gustav F. Gerdts KG, Bremen, Germany

[22] Filed: Apr. 15, 1975

[21] Appl. No.: 568,344

[30] Foreign Application Priority Data
May 28, 1974 Germany............................ 2425879

[52] U.S. Cl.................................. 137/527; 251/337
[51] Int. Cl.²......................................... F16K 15/03
[58] Field of Search............ 137/527, 527.2, 527.4, 137/527.6, 521; 251/337, 303, 313

[56] References Cited
UNITED STATES PATENTS

| | | | |
|---|---|---|---|
| 2,394,747 | 2/1946 | Campbell........................ | 251/303 X |
| 2,492,271 | 12/1949 | Cox et al. ....................... | 251/303 X |
| 2,708,562 | 5/1955 | Schmid........................... | 251/337 X |
| 3,498,322 | 3/1970 | Gilliam........................... | 137/527.2 |
| 3,509,908 | 5/1970 | Latham et al..................... | 137/527 |
| 3,612,098 | 10/1971 | Bora.............................. | 137/527 |

FOREIGN PATENTS OR APPLICATIONS
811,237    4/1959    United Kingdom

*Primary Examiner*—William R. Cline
*Attorney, Agent, or Firm*—Allison C. Collard

[57] ABSTRACT

A flap valve, in particular a check valve comprising a valve housing and a valve seat formed therein, a plate-like locking member cooperating with the valve seat, the locking member being pivotably mounted to the housing, a locking spring extending across a remote front face and having a longitudinal axis substantially crosswise with respect to the pivot direction of the locking member. The locking spring is held axially pretensioned with one end on the valve housing and with another end on the locking member and the locking spring has the form of a leg spring and at least one winding connecting the legs. The windings are mounted substantially parallel to the front face of the locking member.

7 Claims, 3 Drawing Figures

FLAP VALVE

The present invention relates to a check valve in general and, in particular, to valves of the flap type.

It is important to make sure that the locking effect of the valve spring increases only slightly above the opening hub of the locking member, or to even decrease this effect. The purpose is to eliminate unstable and partly open positions in the check valves and to assure a complete opening of the valve.

This particular type of locking effect is provided by a check valve having a valve housing and a valve seat, a plate-like member which cooperates with the valve seat, the locking member being pivotably mounted on an axle which is mounted in the valve housing, and with a locking spring which extends across the front face of the locking member, which face is remote from the valve seat, whereby the longitudinal axis is substantially lateral with respect to the pivot direction of the locking member, and the locking spring being attached with one end to the valve housing and with the other end on the locking member in axial direction. The valve spring moves vertically with respect to the pivot movement of the locking member. For this purpose, the spring is supported behind the center of rotation at the valve housing, when viewed from the valve seat, and creates a rotating movement on the locking member in the locking direction. If, when seen from the valve seat, the supporting point for the spring is laterally offset with respect to the center of rotation of the axis, the required length of the lever arm for creating the required locking moment is decreased. Thus, an increase of locking movement with respect to the effect on the locking member can be compensated, and if need be, even decreased in its closing effectiveness.

In a known embodiment of these types of valves (British Pat. No. 811,237), a leaf spring is used as the spring element which is arched vertically with respect to the locking member front face. It had been shown that the desired evenness or decreasing of the spring force at the locking member could not be maintained due to the relative stiffness when the leaf spring is loaded in sense of buckling. With respect to the construction of the flap valve it is extremely difficult to arrange the center of rotation of the locking member and the spring mounting in such a way that the increase in spring pressure, which is exerted on the locking member can be adequately compensated during the opening movement of the valve. Another disadvantage exists due to the arching of the leaf spring above the front face of the locking member. This requires the providing of a large receiving chamber which can be penetrated by the leaf spring when the locking member is pivoted outwardly, so as not to be subjected to a premature hub limitation by the housing wall. Furthermore, the arch in the leaf spring is increased during the opening movement of the valve.

It is therefore an object of the invention to improve the valves of the aforementioned types in that only a slight increase of the spring effect on the locking member occurs, while the valve is moving into an opening position. Furthermore, the locking spring can be constructed in the form of a relatively flat member.

The leg spring which is used in the present invention has a lesser stiffness with respect to the leaf spring, so that an eventual increase in the spring force during opening of the valve is very low. This facilitates the desired spring effect on the locking member. Furthermore, the suggested spring requires only a low structure above the front face of the locking member, because the spring is in a very flat position and because the movement of the spring during opening of the valve takes place in a substantially parallel plane with respect to the front face. However, the spring movement does not affect the height of the construction of the device.

In accordance with a further improvement the force of the spring does not increase, but actually decreases in the final stage during the opening movement of the valve which facilitates the spring effect on the locking member when opening the valve.

It is possible to further decrease the height of spring constructions, because due to the use of two adjacent leg springs the individual spring may be dimensioned substantially weaker and flatter.

The invention also provides advantageous embodiments for the spring abutments. The leg springs are mounted with only a few simple mounting means, so as to prevent an outward pivoting from their mounted position which is parallel with respect to the locking member.

Other objects and features of the present invention will become apparent from the following detailed description when taken in connection with the accompanying drawings which disclose several embodiments of the invention. It is to be understood that the drawings are designed for the purposes of illustration only, and are not intended as a definition of the limits and scope of the invention.

In the drawings wherein similar reference numerals denote similar elements throughout the several views.

Figure 1:
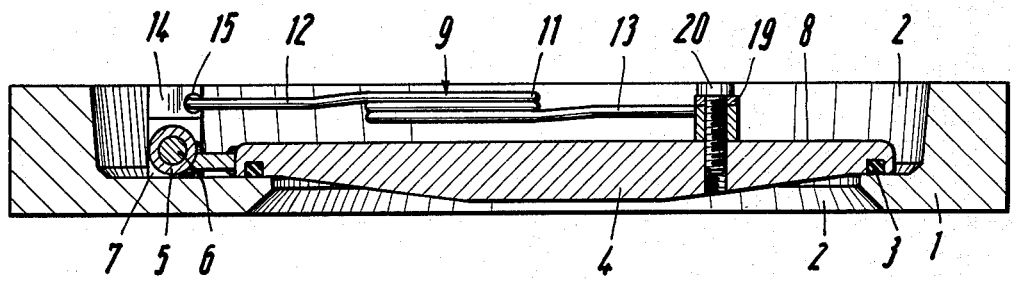
FIG. 1 is a sectional view of the check valve of the invention in closed position.
Figure 2:
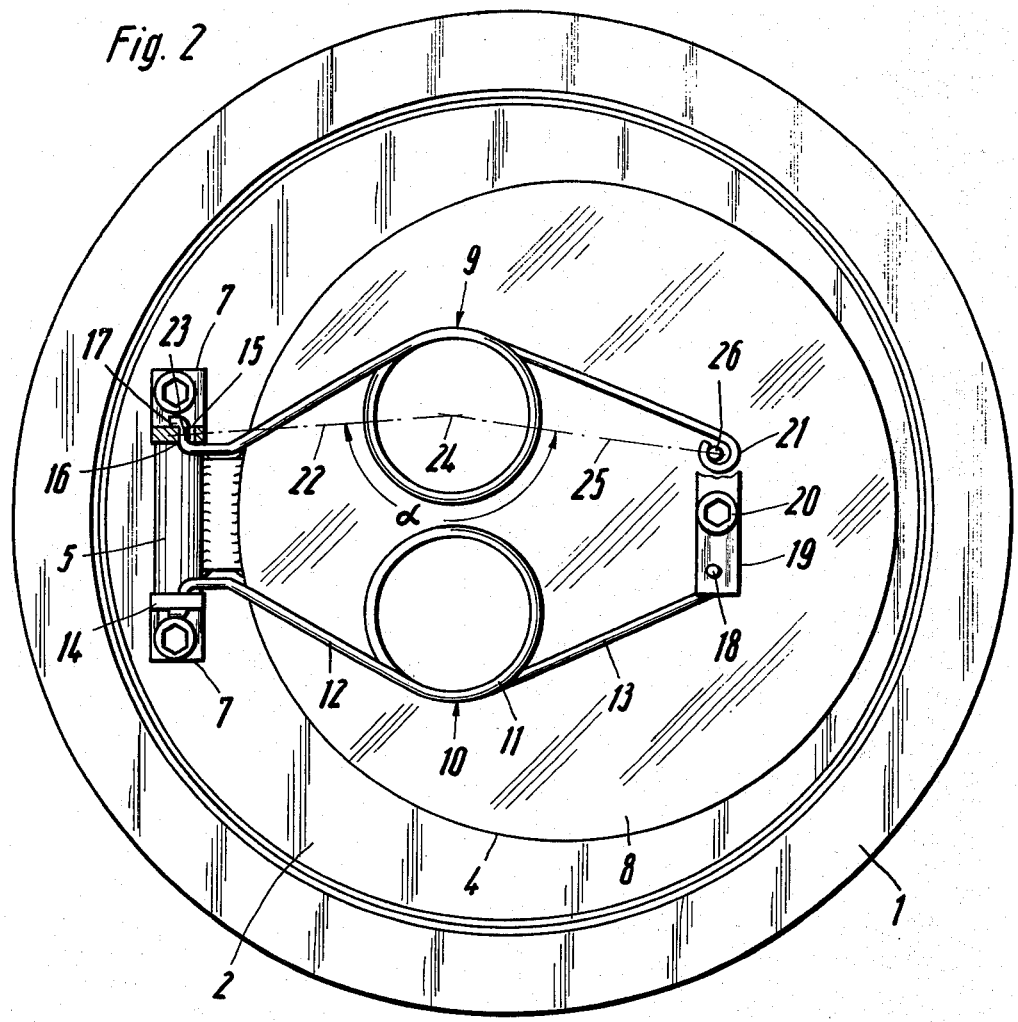
FIG. 2 is a plan view of the check valve of FIG. 1.
Figure 3:
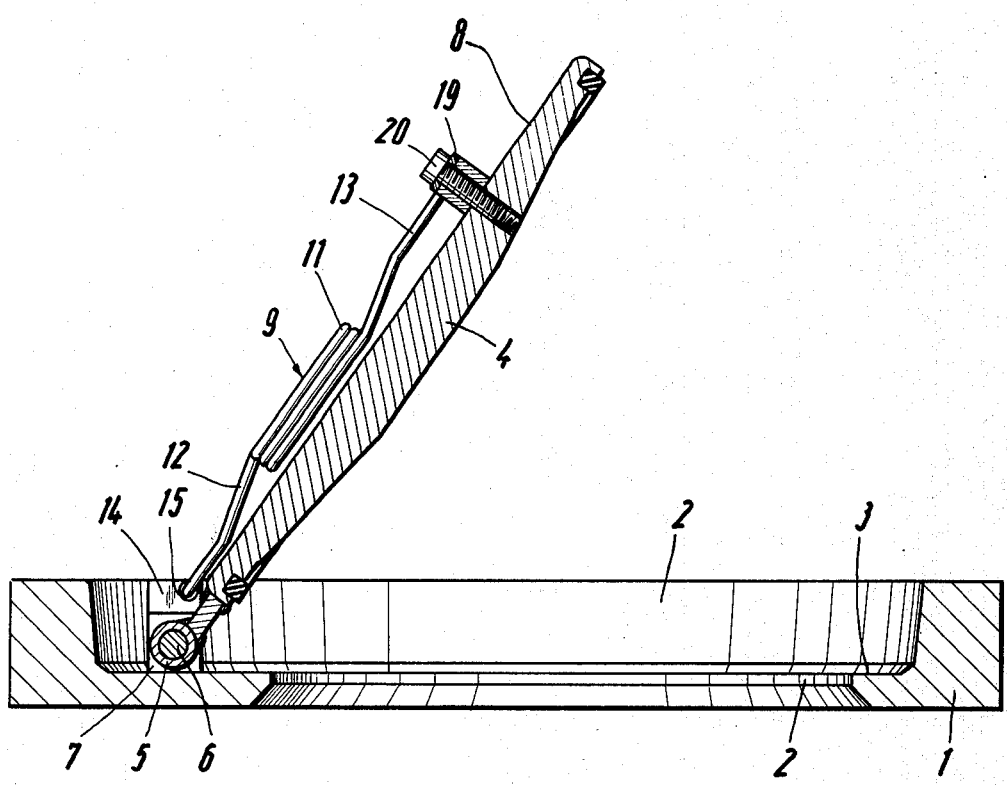
FIG. 3 is a sectional view of the check valve of FIG. 1 in the open position.

Referring now to FIGS. 1-3, a disk-like valve housing 1 is provided with an increasingly widening canal 2 which is offset at its outlet side. The front face of the canal heel portion forms the valve seat 3 at the inner edge portion and receives a plate-like locking member 4. This member is pivotably mounted on an axle 6 by means of a bushing 5, whereby the axle is mounted in two support shoulders 7 which are mounted on the valve housing 1.

For the locking loading of the locking member 4, two leg springs 9, 10 are provided across a front face 8 which faces away from the valve seat 3. These springs are mounted homologous (mirror inverted) adjacent to each other and are provided with a plurality of parallel mounted windings 11. The ends of the windings form legs 12, 13 which run substantially parallel with respect to the front face 8, but run opposite with respect to each other.

The mounting supports 7 are provided with arresting arms 14 and serve as abutments for the leg springs 9, 10. These arms 14 are provided with bores 15 which run parallel with respect to the pivot axle 6. Furthermore, these bores, when seen from the direction of valve seat 3 are mounted at a distance behind the center axis of rotation and are laterally offset with respect to the center axis of rotation and with respect to the locking member 4.

For retaining leg springs 12 at the abutment, the leg springs 12 are provided with angular portions 16 which pass through the bores 15 in the axial direction. The end sections of the angular portions which freely extend from the bores are radially bent in the form of safety catches 17, which prevent the spring ends from sliding out of the bores 15 during the operation of the valve. The bores 15 and the safety catches 17 are such that the angular portions 16 including the safety catches 17 can be easily introduced through the bores during assembly. There is also the necessary pivot possibility of the leg spring 12 parallel to the front face 8.

Pins 18 serve as abutments for the springs at the locking member, which pins extend vertically from the front face 8 of the locking member and carry a transverse member 19 at their free ends. This transverse member 19 is fixedly connected between the two pins 18 with locking member 4 by means of a screw 20. The legs 13 of the leg springs 9, 10 are each provided with a mounting loop 21 at the free ends of the legs each of which loop 21 encompasses each pin 18. In this manner, the leg springs 9, 10 are non-detachably connected with locking member 4. This arrangement also assures the required pivot movement of lever arms 13 parallel to the front face 8.

Furthermore, the leg springs 9, 10 are safely mounted at the housing portion and the locking member against an outwardly pivoting of the position parallel with respect to the front face 8.

Furthermore, the leg springs 9, 10 are tensioned with pretension between their abutments 14, 18. The structure of the leg springs is such that in the relaxed spring condition, i.e., before installing the spring into the valve, the ideal straight line 22 between the supporting point 23 of the leg 12 and the winding axis 24 with respect to the ideal straight line 25 between the supporting point 26 of the leg 13 and the winding axis 24 stands at an angle $\alpha$ of more than 180°. For installation, the leg springs 9, 10 are pretensioned to such an extent until the ideal straight lines 22, 25 are swung across the outstretched position into an angle $\alpha$ of less than 180°, as can be seen from FIG. 2.

The forces of the leg springs 9, 19 increase in the longitudinal direction, i.e., in the direction of the connecting straight lines 22, 25 when compressed while pivoting locking member 4 outwardly, provided that the corresponding straight lines 22, 25 are at an angle $\alpha$ of less than 180° with respect to each other. This is achieved by the aforementioned pretension of springs 9, 10 so that the spring force decreases substantially during the longitudinal compression of the springs.

When outwardly pivoting the locking member 4, the effective lengths of the lever arm between the axle 6 and the supporting point 23 shorten which effect the leg springs 9 and 10 and on the locking member 4. This shortening of the effective lever arm length and the decreasing spring force result in a decrease of the spring forces on the locking member 4, which facilitates the locking effect as desired in check valves.

While only a single embodiment of the present invention has been shown and described, it will be obvious to those skilled in the art that many changes and modifications may be made thereunto without departing from the spirit and scope of the invention.

What is claimed is:

1. A flap valve, in particular a check valve comprising:
    a valve housing having a valve seat formed therein;
    a plate-like locking member cooperating with said valve seat;
    an axle disposed on said valve housing, for pivotably mounting said locking member; and
    at least one locking spring extending across a front face of said locking member, said front face being remote from said valve seat and having a longitudinal axis substantially crosswise with respect to a pivot direction of said locking member, said locking spring being held axially pretensioned with one end of said valve housing and with another end on said locking member, said locking spring having the form of a leg spring having two ends constituting legs and at least one helical winding connecting said legs, at least one said helical winding defining an axis, said legs extend opposite to each other and transverse relative to the axis of said helical winding, and wherein said at least one winding is mounted substantially parallel to said front face of said locking member.

2. The flap valve according to claim 1 wherein said leg spring defines (an) a first ideal straight imaginary connection line between (an) the axis of said winding of the spring and a point of connection of the spring to said locking member, as well as (an) a second ideal straight imaginary connection line between said axis of said winding and a point of connection to said valve housing;
    said first and second ideal imaginary connection lines being oriented (disposed) at an angle of (over) more than 180° in a completely (relaxed) unconnected untensioned state of said spring; and in (an) a connected installation position in said flap valve, constituting a stretched pretension position of said spring legs in said flap valve, said first and second straight imaginary connection lines being (pivoted) oriented at an angle of less than 180°.

3. The flap valve according to claim 1 wherein said at least one locking spring constitutes two leg springs arranged in mirror inverted position.

4. The flap valve according to claim 1 further comprising a housing abutment for said locking spring constituting two arresting arms which are connected to said valve housing, said housing arms being formed with bores which run parallel to the pivot axle of said locking member, and said spring being formed adjacent said housing with an angular portion at a free end thereof which engages one of said bores in an axial direction thereof, and said angle portions including safety catches which extend radially from said bores, respectively.

5. The flap valve in accordance with claim 1 further comprising:
    a spring abutment provided at said locking member and constituting two retainer pins which extend vertically with respect to said locking member; and
    (of) said at least one locking spring constitutes two locking springs, each of said two locking springs is formed with a loop formed at a free end thereof, said loop pivotably surrounding a corresponding one of said retainer pins.

6. The flap valve according to claim 5 further comprising a head piece disposed on an end of each of said pins complementary to the size of said loop to prevent said loop from sliding off said pin.

7. The flap valve according to claim 1 wherein said at least one helical winding comprises a plurality of superimposed helical windings.

* * * * *